G. A. MEAD.
RAIL BOND.
APPLICATION FILED JUNE 21, 1916.

1,297,382.

Patented Mar. 18, 1919.
2 SHEETS—SHEET 1.

Inventor,
George A. Mead.

By Brown, Nissen & Sprinkle
Attorney

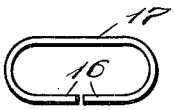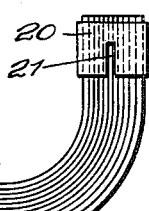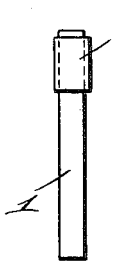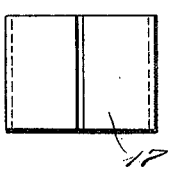
Fig. 9   Fig. 10   Fig. 15   Fig. 14
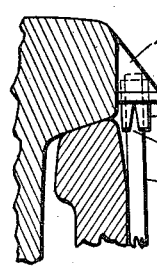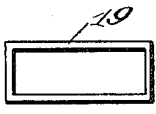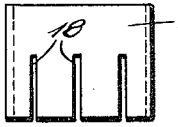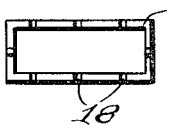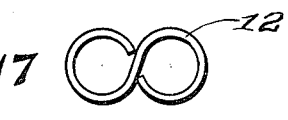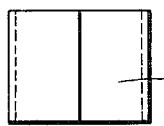
Fig. 19   Fig. 12   Fig. 11   Fig. 13   Fig. 17   Fig. 16
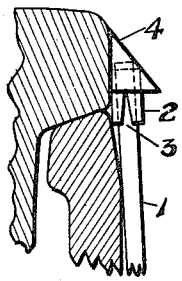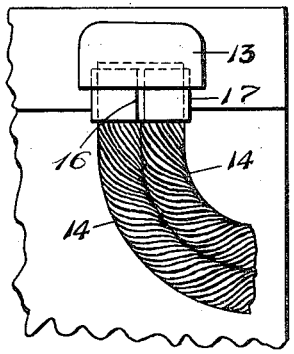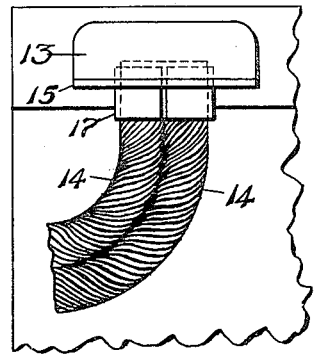
Fig. 18   Fig. 20   Fig. 21

UNITED STATES PATENT OFFICE.

GEORGE A. MEAD, OF MANSFIELD, OHIO, ASSIGNOR TO THE OHIO BRASS COMPANY, OF MANSFIELD, OHIO, A CORPORATION OF NEW JERSEY.

RAIL-BOND.

1,297,382.   Specification of Letters Patent.   Patented Mar. 18, 1919.

Application filed June 21, 1916. Serial No. 104,854.

*To all whom it may concern:*

Be it known that I, GEORGE A. MEAD, a citizen of the United States, residing at Mansfield, in the county of Richland and State of Ohio, have invented certain new and useful Improvements in Rail-Bonds, of which the following is a specification.

This invention relates to the construction and manufacture of rail bonds. Among the objects of the invention are: to produce a bond which is both economical and practical to manufacture and install; to produce a bond which is applied to a rail by welding or brazing; to produce a bond which has a minimum amount of metal in its construction, making it unattractive to thieves where the bond is used in exposed places; to produce a bond which is applied by means of a heating flame, and which when so applied, is more difficult to remove than the bonds previously used; to provide a bond which has the copper in the end protected from the intense heat of a flame and suitably strengthened; and to produce a bond which can be manufactured without injuring the ribbons or wires, usually of copper, of which the bond is made, which will have longer life after being applied to a rail through the construction which is used in producing the bond as described later on. Other objects will hereinafter appear.

Figure 1:
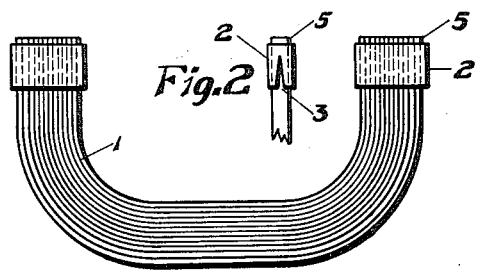
Figure 3:
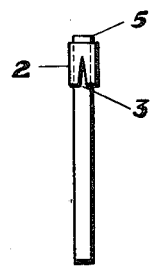
Figure 4:
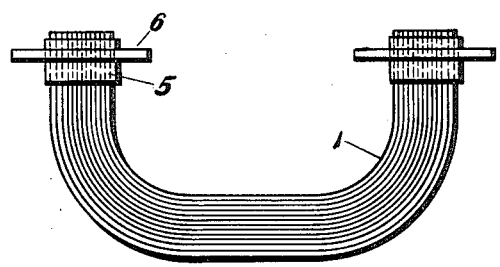
Figure 5:
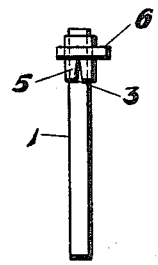
Figure 7:
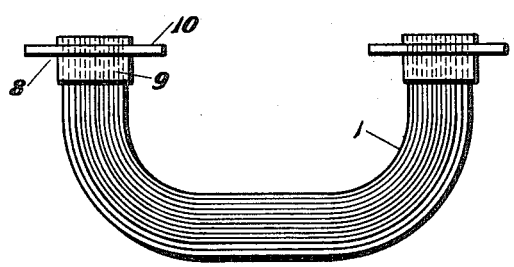
Figure 8:
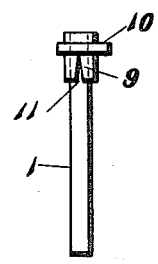
Figure 6:
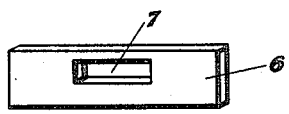

The invention consists in the features of novelty in the construction, combination and arrangement of the several parts. In the accompanying drawings, Figure 1 is a side elevation of one form of bond; Fig. 2 is an end elevation showing one terminal; Fig. 3 is an end elevation of the bond shown by Fig. 1; Fig. 4 is a side elevation of a bond similar to Fig. 1 with a detachable shelf member; Fig. 5 is an end elevation of the bond shown by Fig. 4; Fig. 6 is a perspective of a shelf shown by Fig. 4; Fig. 7 is a side elevation of a modified form of the invention; Fig. 8 is an end elevation taken at right angles to Fig. 7; Fig. 9 is a side elevation of a modified form of bond; Fig. 10 is an end elevation taken at right angles to Fig. 9; Figs. 11, 12 and 13 are side elevation, top and bottom plan views respectively of a modified form of sleeve used with the bond; Figs. 14 and 15 are a side elevation and a top plan view of a modification of the sleeve; Figs. 16 and 17 are a side elevation and a top plan view of another sleeve modification; Fig. 18 is a view showing a bond constructed in accordance with Fig. 1 applied to a rail; Fig. 19 is an end view showing a bond constructed in accordance with Fig. 4 applied to a rail; Fig. 20 is a side elevation of a bond attached to a rail; and Fig. 21 is a side elevation of a modified form of bond attached to a rail.

This invention is an improvement over the bonds now used and on the market for electrically connecting adjacent ends of rails which are attached by riveting, bolting, soft soldering, and even hard soldering and welding, in that this type of bond comprises a novel construction and method of applying it to a rail.

It is found that in welding or brazing forged copper at a temperature approaching or equaling the melting point of copper, there is a line of weakness between the attaching metal and the copper, so that they can be easily torn apart when external force is applied, but which under normal conditions does not affect the electrical or mechanical properties of a bond joint. To overcome this weakness and make use of a heating flame, such as oxyacetylene, oxyhydrogen, electric arc, and the like, the weak union between the copper and the attaching metal is mechanically supported by so constructing the bond which will have at all times not only the copper of the body united to the attaching metal, but also there will be a portion of iron, steel, nickel, or their compounds, which do not exhibit the weakness of copper, and which is in strong mechanical union with the copper body.

One form of the bond, shown in Fig. 1, consists of a body portion 1 made of a plurality of copper ribbons; wires may be used if formed into a cable for convenient handling. A sleeve 2 is placed around the ends of the body, and not only for the purpose of holding the ends of the body in place and in shape, but also for giving strong mechanical support to the body 1 when applied to a rail. To obtain the best results from this standpoint, the preferable construction is to make the sleeve 2 of iron, steel, nickel, or an iron and nickel compound, any of which has a higher melting point than copper and is stronger mechanically, section for section, which has been discovered makes a stronger union with the welding or attaching metal than copper, the sleeve, being easily compressed on the body.

It is not advisable to grip the body 1 of the bond tightly throughout the entire length of the sleeve, especially when the body is composed of a plurality of small wires, which is often the case, and to avoid this, various ways of overcoming the difficulty are shown.

One means is to make the lower portion of the sleeve split at one or more places from the end in order to add elasticity and make that portion of the sleeve which is split more yieldable and less rigid, than where the sleeve is not split. The sleeve 2, in Fig. 1, is split at two points, as indicated by the reference numeral 3, in Figs. 2 and 3. The slot formed by splitting the sleeves may be of any desired shape, such as a V-shape, the slot having open or spaced parallel sides, or simply a slit having abutted edges.

In manufacturing this bond, the sleeve 2 is made of seamless tubing, a malleable casting or forging, and is placed over the end of the body 1 and strongly compressed in place when cold, or under a low heat. If the sleeve is not split and compressed the full length, it will be understood that the portion of the body 1 held in the sleeve is rigid and immovable, and that when the bond is installed, any movement of the members of the body 1 stops abruptly where the exposed end of the sleeve terminates, but if the exposed part of the sleeve were made with two or more slots 3, there would be less compression and more yielding of the sleeve below an attaching metal 4 (see Fig. 18) when the body 1 of the bond is moved, thus preventing wear, and increasing the life of the bond.

Another advantage which the slotting of the sleeve will produce is, that it is more difficult to tear the bond from a rail, since the exposed part of the sleeve which protrudes from under the attaching metal 4, will yield and open up when anyone attempts to pry the bond off by means of the loop of the bond, thus reducing the leverage upon the attaching metal.

In Fig. 18 is shown an end view of the bond of Fig. 1 when installed on a rail, which is accomplished by placing the bond against the rail, applying a heating flame of from 4,000 to 6,000 degrees F. until the parts are brought up to, or nearly to the melting point of the bond body, and then applying an attaching metal in the form of a rod or wire which will melt at once and unite with the bond body, the sleeve and the rail, thereby forming an integral union of the parts. This method of applying a bond of this class is shown, described and claimed in my copending application, Serial No. 101,419, filed June 2, 1916.

In order to obtain the best results, the end of the body 1 extends slightly outside or beyond the sleeve 2, as indicated by the numeral 5 in Figs. 1, 2 and 3, and the sleeve 2 is extended well into the attaching metal 4, as shown in Fig. 18, when applied to a rail. This gives a construction which is mechanically strong and electrically efficient, and by having the sleeve 2 split below the attaching metal 4, the sleeve does not grip the body 1 tightly at this point, thereby allowing freedom of movement of the body within the sleeve, increasing the life of the body, and decreasing the leverage on the attaching metal 4 when external force is applied to pry the bond from the rail.

In Fig. 20, it will be observed that the length of contact of the attaching metal, designated by the reference numeral 13, to the rail is not much greater than that of the width of the bond; this gives a limited area of contact with the rail, but a way has been devised of increasing this contact with the rail and strengthening the contact with the bond, by constructing the bond, as shown in Figs. 4 and 5, with a detachable shelf 6, having an opening 7, which is slipped over the sleeve 2 of Fig. 1, producing a bond, as shown in Figs. 4 and 5, which allows of a greater contact with the rail by providing a shelf upon which the attaching metal can be built.

It is obvious that various forms of sleeves may be adopted without departing from the spirit and scope of the invention; in Figs. 9 and 10, a bond is shown having sleeves 20 positioned at a distance from the end, and instead of being slotted at the ends of the sleeves, as in Fig. 1, the sleeves are provided with slots 21 at the sides thereof; Figs. 11, 12 and 13 show a sleeve 19 of seamless tubing which is provided with a plurality of slots 18 both in the sides and ends of the sleeve. This sleeve 19 and sleeve 20 are both formed to receive a bond body made of a plurality of metal ribbons, but the sleeves can also be made round or oval to take a single cable or two parallel cables. In Figs. 14 and 15, an oval sleeve 17 is shown in which the slot is made by spacing the ends 16 from each other as great a distance as desired. Instead of an oval sleeve, a sleeve 12, as shown by Figs. 16 and 17, may be employed, which is in the shape of a figure 8, the ends being spaced apart to provide for the resilience which is desirable. This sleeve may be used at the ends of a bond consisting of two round cables. It is obvious that both of the sleeves 17 and 12 may be slotted in various ways to meet different requirements, and the sleeve 17 has the advantage that it can be formed before or at the time of placing it about the body bond.

When a bond, like that shown by Fig. 1, is applied to a rail, the attaching metal 4 is built up around the end of the sleeve, as shown by Fig. 18. When a loose shelf is applied to the sleeve, as shown by Fig. 4, the attaching metal 4 fills in the angular space between the shelf and the adjacent face of the rail, as indicated by Fig. 19. In Fig. 20 is shown one end of a bond consisting of a pair of stranded metal conductors 14 which are inserted in the sleeve 17, as shown by Figs. 14 and 15. This shows an attaching metal 13 which covers the ends of the conductors 14 and a portion of the sleeve 17, the sleeve having a slot formed by the spaced extremities 16. Fig. 21 shows a construction similar to that shown by Fig. 20, with the exception that the bond terminal is provided with a shelf 15, as shown by Fig. 6. This construction permits of applying more attaching metal 13 to unite the bond to the rail, the amount of attaching metal depending upon the size of the shelf itself.

In the modification of the structure of Figs. 4 and 5, as shown by Figs. 7 and 8, the shelf 10 is made integral with the sleeve 9 forming a terminal 8, and that portion of the sleeve below the shelf is slotted at one or more places, as indicated by the numeral 11.

Although a number of different constructions are shown for accomplishing the result desired, it is obvious that there are still other forms and constructions which would also accomplish this result without departing from the invention as defined by the claims.

I claim:—

1. A rail bond comprising a body consisting of a plurality of flexible members, a slotted sleeve encircling the ends of the members, and a projecting shelf extending from the sleeve at a distance from both ends thereof.

2. A rail bond comprising a body portion consisting of a plurality of flexible members, a sleeve encircling each end of the body portion, and a shelf having a perforation which fits the sleeve closely and projecting therefrom intermediate the ends of the sleeve.

3. A rail bond comprising a body portion consisting of a plurality of flexible members, a sleeve encircling the members adjacent the end of the body having slots therein, a shelf having a perforation which fits closely over the sleeve intermediate the ends thereof, and a bond attaching metal covering one end of the body from the said shelf.

4. A rail bond comprising a plurality of flexible members, a slotted sleeve of metal unlike that of said members encircling the members and holding them together at the ends, and a projecting member intermediate the ends of the sleeve extending in a plane transverse to the axis of the sleeve.

5. A rail bond comprising a bond, and terminals of a dissimilar metal, the terminals comprising a slotted sleeve inmovably fixed on the bond before it is attached to the rail and a shelf member surrounding the sleeve.

6. A rail bond comprising a plurality of flexible members, and a sleeve at each end of the bond holding the members together each formed with a slot to allow the members to give at the inner end of the sleeve and provided with a projecting member.

7. A rail bond comprising a plurality of flexible members, and terminals, the terminals each consisting of a sleeve surrounding the members and a yielding portion at one end of the sleeve, and a shelf surrounding the sleeve at a distance from the yielding end to permit the flexible members to yield for a predetermined distance within the sleeve.

8. A rail bond comprising a plurality of flexible members, a sleeve encircling the flexible members at their ends and holding them tightly together at the end of the bond, but permitting a yielding movement at the inner end of the sleeve, and a member projecting from the sleeve to limit the extent of the yielding movement of said flexible members within the sleeve.

9. A rail bond comprising a plurality of flexible members and a terminal for each end consisting of a sleeve encircling the members and binding them closely together at their extremities, but permitting a yielding movement of the members at the other end of the sleeve, and a shelf member projecting from the sleeve to prevent the yielding movement of the members with respect to each other at the ends of said members.

10. A rail bond comprising a body consisting of a plurality of flexible members, a slotted sleeve encircling the ends of the members, and a projecting shelf extending from the sleeve at a distance from both ends thereof, the shelf and sleeve being composed of metal having a higher melting point than the bond body.

11. A rail bond comprising a body consisting of a plurality of flexible members, a slotted sleeve encircling the ends of the members, and a projecting shelf extending from the sleeve at a distance from both ends thereof, the shelf and sleeve being composed of a metal dissimilar to that of the bond body.

12. A rail bond comprising a flexible body, a sleeve encircling each end of the body, and a shelf extending from the sleeve in a plane other than parallel to the axis of the sleeve and body and intermediate the ends thereof.

13. A rail bond comprising a flexible body, a sleeve encircling each end of the body, and a shelf extending from the sleeve in a plane other than parallel to the axis of the sleeve and body and intermediate the ends thereof, both the sleeve and shelf being composed of metal having a higher melting point than the flexible body.

14. A rail bond comprising a flexible body, a yieldable sleeve encircling each end of the body and a shelf extending from the sleeve intermediate the ends thereof.

15. A rail bond comprising a flexible body, a yieldable sleeve encircling each end of the body, and a shelf extending from the sleeve intermediate the ends thereof, both the sleeve and shelf being composed of metal having a higher melting point than the flexible body.

16. A rail bond comprising a flexible body, a split sleeve projecting from and encircling each end of the body, and a shelf encircling the sleeve intermediate the ends thereof.

17. A rail bond comprising a flexible body, a split sleeve encircling each end of the body, and a shelf encircling the sleeve intermediate the ends thereof, the sleeve and shelf being composed of metal having a higher melting point than the flexible body.

18. A rail bond adapted to be attached by welding, consisting of a flexible body having each end encircled by a slotted sleeve provided with a shelf extending from the sleeve.

19. A rail bond adapted to be attached by welding, consisting of a flexible body having each end encircled by a slotted sleeve provided with a shelf extending from the sleeve, the sleeve and shelf being composed of metal having a higher melting point than the flexible body.

20. A rail bond comprising a flexible body, a split sleeve surrounding each end of the body, and a projection encircling the sleeve.

21. A rail bond comprising a flexible body, a split sleeve surrounding each end of the body, and a projection encircling the sleeve, both the sleeve and shelf being composed of metal having a higher melting point than the flexible body.

22. A rail bond comprising a body, a sleeve encircling each end of the body, and a projection from the sleeve, the sleeve being provided with yielding means between the sleeve and body.

23. A rail bond comprising a body, a sleeve encircling each end of the body, and a projection from the sleeve, the sleeve being provided with yielding means between the sleeve and body, both the sleeve and shelf being composed of metal having a higher melting point than the flexible body.

24. A rail bond comprising a body consisting of a plurality of flexible members, a retaining member attached to each end of the body for gripping and holding the flexible members, and means projecting from and intermediate the ends of the retaining member in a plane other than parallel to the axis of the bond body.

25. A rail bond comprising a body consisting of a plurality of flexible members, a retaining member attached to each end of the body for gripping and holding the flexible members, and means projecting from and intermediate the ends of the retaining member in a plane other than parallel to the axis of the bond body, both the sleeve and shelf being composed of metal having a higher melting point than the flexible body.

26. A rail bond comprising a flexible bond body and terminals having a higher melting point than the body, the terminals being slotted and compressed on the body and provided with an extending shelf.

27. A rail bond comprising a plurality of flexible members and a retaining member adjacent each end of the bond body for holding the members together, with means to allow the members to give under strain and with a projection intermediate the ends of the retaining member extending in a plane other than parallel to the flexible members.

28. A rail bond comprising a flexible body, a sleeve encircling each end of the body, and means projecting from the sleeve intermediate the ends thereof for offsetting the sleeve from the surface of a rail to which it is to be attached.

29. A rail bond comprising a flexible body, a sleeve encircling each end of the body, and means projecting from the sleeve intermediate the ends thereof for offsetting the sleeve from the surface of a rail to which it is to be attached, the sleeve and said means being composed of a ferrous metal.

30. A rail bond comprising a flexible body, the body being encircled at each end by a sleeve which is split at one end for a portion of its length, and a shelf projecting from the sleeve intermediate the ends in a plane other than parallel to the axis of the sleeve and body.

31. A rail bond comprising a flexible body, a sleeve encircling each end of the body, the sleeve being provided with a separately formed shelf therefor located intermediate the ends of the sleeve.

32. A rail bond comprising a flexible body, a sleeve encircling each end of the body, the sleeve being provided with a separately formed shelf therefor located intermediate the ends of the sleeve, both the sleeve and shelf being composed of metal having a higher melting point than the flexible body.

33. A rail bond comprising a flexible body having each end encircled by a split sleeve and provided with means for offsetting the sleeve from a rail surface.

34. A rail bond comprising a flexible body having each end encircled by a split sleeve composed of metal having a higher melting point than the body and provided with means for offsetting the sleeve from a rail surface.

35. A rail bond comprising a flexible body having each end encircled by a split sleeve and provided with means located intermediate the ends thereof for offsetting the split sleeve from a rail surface.

36. A rail bond comprising a flexible body having each end encircled by a split sleeve composed of metal having a higher melting point than the body and provided with means located intermediate the ends thereof for offsetting the split sleeve from a rail surface.

37. The combination with a rail, of a rail bond adapted to be attached by welding; the bond consisting of a flexible body having each end encircled by a split sleeve, the sleeve provided with means intermediate its ends for offsetting the sleeve from the surface of the rail; and attaching metal united to the sleeve and bond body and embracing the sleeve for integrally uniting the sleeve and bond body each to the rail.

38. The combination with a rail, of a rail bond adapted to be attached by welding; the bond consisting of a flexible body having each end encircled by a split sleeve, the sleeve composed of metal having a higher melting point than the flexible body, and provided with means intermediate its ends for offsetting the sleeve from the surface of the rail; and attaching metal united to the sleeve and bond body and embracing the sleeve for integrally uniting the sleeve and bond body each to the rail.

39. The combination with a rail, of a rail bond adapted to be applied by welding; the bond consisting of a body composed of a plurality of flexible members and each end of the body having a retaining member for gripping and holding the flexible members together, the retaining member being provided with means intermediate its ends for offsetting the retaining member from the surface of the rail to which the bond is applied; and attaching metal united to the retaining member and embracing the same and also united to the body members and integrally connecting the said retaining member and bond body each to the rail.

40. The combination with a rail, of a rail bond adapted to be applied by welding; the bond consisting of a body composed of a plurality of flexible members and each end of the body having a retaining member composed of metal having a higher melting point than the said flexible members for gripping and holding the flexible members together, the retaining member being provided with means intermediate its ends for offsetting the retaining member from the surface of the rail to which the bond is applied; and attaching metal united to the retaining member and embracing the same and also united to the body members and integrally connecting the said retaining member and bond body each to the rail.

41. The combination with a rail; of a rail bond comprising a body of flexible members, a slotted sleeve encircling the ends of the members and a projecting shelf extending from the sleeve at a distance from both ends thereof; and attaching metal applied to the flexible members, the sleeve and the shelf, integrally uniting each of them to the rail.

42. The combination with a rail; of a rail bond comprising a body of flexible members, a slotted sleeve encircling the ends of the members and a projecting shelf extending from the sleeve at a distance from both ends thereof, both sleeve and shelf being composed of metal having a higher melting point than the flexible body; and attaching metal applied to the flexible members, the sleeve and the shelf, integrally uniting each of them to the rail.

43. A rail bond consisting of a flexible body, a sleeve attached adjacent each end thereof, and means projecting from each sleeve intermediate the ends thereof for supporting an attaching metal adapted to inclose the end of the sleeve and body and to be integrally united thereto and to a rail.

44. A rail bond consisting of a flexible body, a sleeve composed of metal having a higher melting point than the body and attached adjacent each end thereof, and means projecting from each sleeve intermediate the ends thereof for supporting an attaching metal adapted to inclose the end of the sleeve and body and to be integrally united thereto and to a rail.

45. The combination with a rail: of a rail bond comprising a body of flexible members, a sleeve encircling the ends of the members, and a projecting shelf intermediate the ends of the sleeve; and attaching metal united to the sleeve and embracing the same, and also united to the flexible members, integrally connecting the members and the sleeve each to the rail.

46. The combination with a rail of a rail bond comprising a body of flexible members, a sleeve encircling the ends of the members, and a projecting shelf intermediate the ends of the sleeve; and attaching metal applied to the shelf, the sleeve, and the flexible members, and embracing the sleeve, and integrally uniting each of them to the rail.

47. The combination with a rail; of a rail bond comprising a body of flexible members, a retaining member engaging the flexible members adjacent each end thereof with an intermediate part projecting transversely from the retaining member; and attaching metal applied to the projecting part, the retaining member and the flexible members, uniting each to the rail.

48. The combination with a rail; of a rail bond comprising a body of flexible members, a retaining member engaging the flexible members adjacent each end thereof with an intermediate part projecting transversely from the retaining member, the retaining member and the said intermediate part being composed of a metal having a higher melting point than the flexible members; and attaching metal applied to the projecting part, the retaining member and the flexible members uniting each to the rail.

49. The combination with a rail, of a rail bond comprising a body, a terminal having a higher melting point than the body adjacent each end of the body, the terminal having an intermediate projection and slotted at one end; and attaching metal applied to the other end of the terminal and against the projection, and to the exposed end of the bond body integrally uniting each part to the rail.

50. An article of manufacture consisting of a rail bond having a sleeve fastened to the end thereof and having external means forming a ledge provided on said sleeve adjacent but not at the end to the end of the bond which is adapted to catch, support and retain the filling metal used in making the weld, so that the area of said filling metal can be enlarged and built in overlapping relation to said sleeve and welded to the end of the bond.

51. In a rail bond adapted for welding to the rail by oxy-acetylene or other gaseous flame process, and consisting of a flexible body portion incased by a sleeve adjacent and flush with the end thereof, external means provided on said sleeve which is adapted to catch, support and retain the fused filling metal used in making the weld during the welding process so that said filling metal can be built up on the exposed end of said flexible body portion and in overlapping relation thereto.

52. A rail bond, adapted for welding to the rail by oxy-acetylene or other gaseous flame process, and consisting of a flexible body portion incased by a sleeve adjacent to its end, said sleeve being provided with an external ledge adapted to catch, retain and support the fused filling metal used in making the weld so that said filling metal can be built up with an enlarged section and welded to the end of the bond in overlapping relation thereto.

In testimony whereof I have signed my name to this specification, on this 19th day of June, A. D. 1916.

GEORGE A. MEAD.